United States Patent
Rago

(10) Patent No.: US 6,267,147 B1
(45) Date of Patent: Jul. 31, 2001

(54) ACCUMULATOR/OIL TANK FOR JOURNAL OIL SUPPLY

(75) Inventor: Giusseppe Rago, Mississauga (CA)

(73) Assignee: Pratt & Whitney Canada Corp., Longueuil (CA)

(*) Notice: Subject to any disclaimer, the term of this patent is extended or adjusted under 35 U.S.C. 154(b) by 0 days.

(21) Appl. No.: 09/611,969

(22) Filed: Jul. 6, 2000

(51) Int. Cl.[7] ........................................ F16L 55/04
(52) U.S. Cl. ........................ 138/31; 138/30; 138/26
(58) Field of Search ...................... 138/31, 30, 26; 220/720–724

(56) References Cited

U.S. PATENT DOCUMENTS

| | | | |
|---|---|---|---|
| 1,381,765 | 6/1921 | Thompson | 137/87.01 |
| 1,663,647 | * 3/1928 | Brush | 138/31 X |
| 2,833,374 | 5/1958 | Glasser | 184/6.9 |
| 3,015,345 | * 1/1962 | Michael | 138/31 |
| 3,036,809 | * 5/1962 | Kerr | 138/31 X |
| 3,336,948 | * 8/1967 | Lucien | 138/31 |
| 3,672,402 | * 6/1972 | Bloemer | 138/31 |
| 3,722,623 | 3/1973 | Waldecker | 184/6.3 |
| 3,907,001 | * 9/1975 | Vanderlaan et al. | 138/31 |
| 4,058,981 | 11/1977 | Henson | 60/605.3 |
| 4,126,997 | 11/1978 | Henson | 60/605.3 |
| 4,187,682 | * 2/1980 | Shen | 138/31 X |
| 4,377,374 | 3/1983 | Taylor | 417/228 |
| 4,389,984 | 6/1983 | Destrampe | 123/196.5 |

\* cited by examiner

*Primary Examiner*—Patrick Brinson
(74) *Attorney, Agent, or Firm*—Jeffrey W. Astle

(57) ABSTRACT

A combined oil tank and oil accumulator vessel having an internal chamber, and a moveable spring-loaded barrier within the internal chamber defining a low pressure oil tank portion and a high pressure accumulator portion separated by the moveable barrier. The combined oil tank accumulator provides the advantages of more consistent oil flow supply as a result of the integral accumulator, but with reduced weight, reduced oil volume requirements, and constant oil levels when compared with conventional external accumulators.

6 Claims, 1 Drawing Sheet

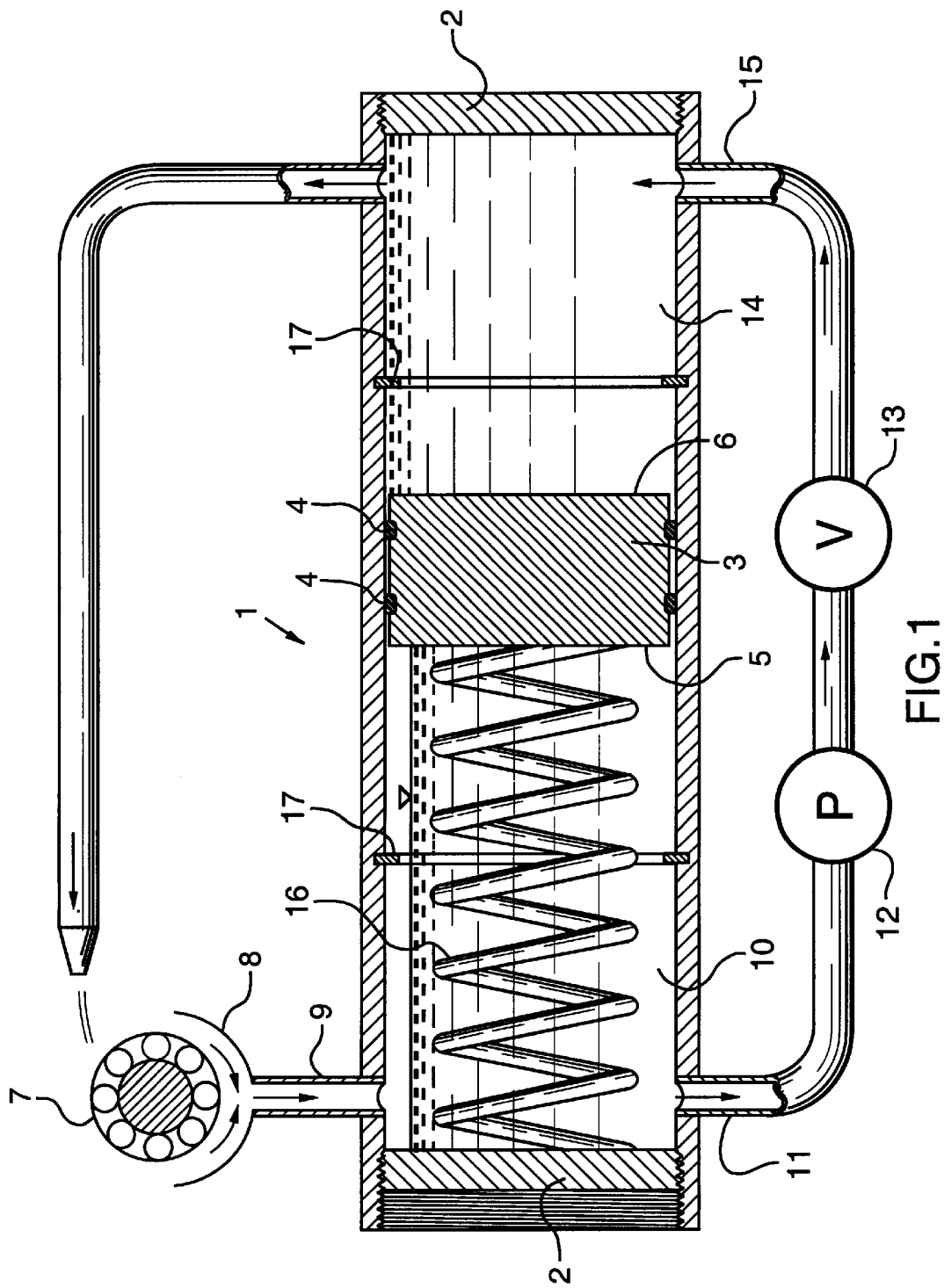

ACCUMULATOR/OIL TANK FOR JOURNAL OIL SUPPLY

TECHNICAL FIELD

The invention relates to a combined oil tank and oil accumulator vessel having an internal chamber, and a moveable spring loaded barrier within the internal chamber defining a low pressure oil tank portion and a high pressure accumulator portion separated by the moveable barrier.

BACKGROUND OF THE ART

In a gas turbine engine or other engine with gearbox containing journals, bearings or other lubricated moving components, high speed motion requires that lubrication be provided consistently. For example, the interruption of oil supply to journals of a high speed gas turbine engine for only two seconds can cause seizing of the bearings and catastrophic failure of the engine. Oil flow for cooling and lubrication must be continuously supplied to journals, gears and bearings, however, oil flow can be interrupted by negative gravity forces, air bubbles in the oil supply lines or temporary malfunction of valves, pumps and filter assemblies. In order to overcome any temporary interruption in oil flow, the prior art includes an oil accumulator within the high pressure oil line downstream of the oil pump to accumulate a volume of oil under pressure, that can be deployed during a temporary interruption.

The provision of an oil tank together with an external accumulator however involves several disadvantages. In aircraft applications especially, the weight and space taken by an oil accumulator is often considered unjustifiable. The added risk of leakage, extra piping and weight of an external accumulator with check valve to separate the high pressure accumulator oil volume from the low pressure oil tank volume is considered by many designers to be unjustified.

In addition, when an external accumulator is provided, the oil tank must be oversized to compensate for the extra oil used in charging the accumulator. When an engine is initially started up, the oil pump withdraws oil from the oil tank, pressurises the oil, and delivers oil to an accumulator. The accumulator fills with pressurised oil and thereafter distributes lubricated oil to the necessary rotating engine components. On engine shutdown, the oil pump ceases operation and the pressurized oil from within the accumulator is released to the gearbox and journals then scavenged and returned to the oil tank. Therefore, when an accumulator is used there is a disadvantage in that the oil tank must be sized to accommodate the extra oil within the system. A further disadvantage of an external accumulator is the variation in oil level between the operating condition with oil stored in the accumulator, and initial start up condition with oil tank level full and accumulator oil level reduced. Therefore, use of an accumulator not only adds the weight and volume of the accumulator and associated piping, but also increases the necessary size, weight and volume of the oil tank to accommodate an increased volume of oil circulating within the oil supply system.

It is an object of the invention to provide a combined oil tank and accumulator in such a manner that the volume of oil circulating within the oil supply system is not increased and wherein the oil level within the oil tank remains relatively constant while providing an accumulator to compensate for oil supply interruption on a temporary basis.

It is a further object of the invention to provide a combined oil tank and accumulator wherein oil level is maintained relatively constant between start and running conditions.

Further objects of the invention will be apparent from review of the disclosure, drawing and description of the invention below.

DISCLOSURE OF THE INVENTION

The invention provides a combined oil tank and oil accumulator vessel having an internal chamber, and a moveable spring loaded barrier within the internal chamber defining a low pressure oil tank portion and a high pressure accumulator portion separated by the moveable barrier. The combined oil tank/accumulator provides the advantages of more consistent oil flow supply as a result of the integral accumulator, but with reduced weight, reduced oil volume requirements, and constant oil levels when compared with conventional external accumulators.

DESCRIPTION OF THE DRAWING

In order that the invention may be readily understood, one embodiment of the invention is illustrated by way of example in the accompanying drawing.

FIG. 1 is a schematic view of an oil supply circuit including a vessel with oil tank portion and accumulator portion separated by an internal spring loaded barrier piston.

Further details of the invention and its advantages will be apparent from the detailed description included below.

DETAILED DESCRIPTION OF PREFERRED EMBODIMENTS

Referring to FIG. 1, the invention provides a combined oil tank and accumulator vessel 1. In the embodiment illustrated the vessel 1 is in the form of a cylinder with threaded end caps 2 and a cylindrical internal chamber. A movable barrier 3 in a form of a cylindrical piston with O-rings 4, disposed within the internal chamber, having a low pressure surface 5 and a high pressure surface 6. Lubricating oil is delivered to engine components such as bearings 7. Return oil is scavenged by the bearing gallery 8 and delivered to a scavenging oil return system to enter the vessel 1 via the low pressure inlet 9.

A low pressure oil tank portion 10 is defined within the chamber of the vessel bounded by the low pressure surface 5 of the barrier 3. The oil tank portion 10 retains oil at or near atmospheric pressure in a manner similar to conventional oil tanks. A certain minimal residence time is desirable in order to ensure that oil withdrawn through the low pressure outlet 11 by the pump 12 does not contain excessive amounts of entrained air bubbles. The oil pump 12 pressurises the oil flow passing it through a one way check valve 13 and into a high pressure accumulator portion 14 via the high pressure inlet 15.

The accumulator portion 14 is likewise defined within the vessel chamber bounded by the high pressure surface 6 of the barrier 3. The oil stored within the accumulator portion 14 is at operating pressure and provides a volume of pressurised oil to accommodate any temporary interruption in oil supply flow. The relative volumes of the oil tank portion 10 and the accumulator portion 14 can be modified by choosing an appropriate spring 16 with desired compressive force to resist the pressure differential between the low and high pressure surfaces 5 and 6 of the barrier 3. To limit the extent of compression and extension of the spring 16, the vessel 1 may include spring lock washers 17 and the positioning of an associated threaded cap 2 may be variable as indicated by the threaded extension on the cylindrical vessel walls. As a result, the extent of the barrier piston 3 movement is limited by the washers 17 and biasing force of the spring 16 can be modified by adjusting the position of the end cap 2.

In the embodiment illustrated, the barrier 3 takes the shape of a cylindrical piston with sliding O-rings engaging the internal cylindrical chamber of the vessel 1. It will be understood however that various other means may be provided as a barrier and biasing means without departing from the teaching of the invention. For example, a flexible diaphragm or expandable bladder may be utilized to separate the high pressure accumulator portion 14 from the low pressure oil tank portion 10 in a similar manner. An advantage of utilising the piston and O-rings 4 as illustrated is that any leakage passing the O-rings 4 is received within the oil tank portion 10 and recirculated. Therefore, wear of the O-rings 4 or failure is not catastrophic but merely reduces the efficiency of the oil supply system.

The invention however provides the advantages of an accumulator without the associated extra oil volume, significantly increased weight or risk of oil leakage. For example, the oil tank portion 10 and accumulator portion 14 at all operating conditions store the same volume of oil. Therefore, unlike conventional external accumulators, the volumes of oil to be accommodated by the oil tank portion need not be designed to carry extra volume. The volume of the accumulator portion 14 at the fully charged position reduces the volume of oil of the oil tank portion 10 by the same amount. No additional oil volume is required within the oil tank portion 10 to account for the volume of the accumulator portion 14 since the volume of the oil tank portion 10 changes with the volume of the accumulator portion 14. In essence, an equivalent amount of oil is removed from the oil tank portion 10 and deposited into the accumulator portion 14 with no net change in total oil volume required for the system.

In addition the oil level within the oil tank portion 10 remains constant regardless of the position of the piston 3 and the relative proportions of oil stored within the accumulator portion 14 and oil tank portion 10. Therefore, oil levels shown on gauges can be maintained at a consistent level regardless of the use of the accumulator.

A significant advantage however is that the benefits of an accumulator can be achieved without also accepting the disadvantages of increased space, increased weight and increased oil volume required. The use of accumulators in aircraft engines has been limited due to disadvantages of increased weight of oil required for the system, increased accumulator weight and space requirements with associated risks of leakage.

Although the above description relates to a specific preferred embodiment as presently contemplated by the inventor, it will be understood that the invention in its broad aspect includes mechanical and functional equivalents of the elements described herein.

I claim:

1. A combined oil storage tank and oil accumulator vessel having an internal chamber, the vessel comprising:
    a moveable barrier disposed within the internal chamber having a low pressure surface and a high pressure surface;
    a low pressure oil storage tank portion defined within the chamber bounded by the low pressure surface of the barrier, the oil tank portion including a low pressure inlet and low pressure outlet;
    a high pressure accumulator portion defined within the chamber bounded by the high pressure surface of the barrier, the accumulator portion including a high pressure inlet and a high pressure outlet; and
    spring biasing means co-acting with the barrier for resisting the pressure differential between the low and high pressure surfaces of the barrier wherein the vessel operates to continuously provide and reclaim oil without interruption.

2. A combined oil tank and oil accumulator vessel according to claim 1, wherein the barrier comprises a piston with a sliding seal engaging the internal chamber of the vessel.

3. A combined oil tank and oil accumulator vessel according to claim 2, wherein the vessel is cylindrical and the seal comprises an O-ring.

4. A combined oil tank and oil accumulator vessel according to claim 1, wherein the spring biasing means is disposed within at least one of the low and high pressure portions of the vessel.

5. A combined oil tank and oil accumulator vessel according to claim 1, including limiting means for limiting the extent of barrier movement.

6. A combined oil tank and oil accumulator vessel according to claim 5, wherein the spring biasing means include adjustment means for modifying the biasing resistance of the barrier.

* * * * *